United States Patent [19]

Weirich et al.

[11] Patent Number: 4,544,185

[45] Date of Patent: Oct. 1, 1985

[54] HYDRAULIC COUPLING DEVICE

[75] Inventors: Walter Weirich, Dortmund; Bernd Peters, Dülmen, both of Fed. Rep. of Germany

[73] Assignee: Gewerkschaft Eisenhutte Westfalia, Luaen, Fed. Rep. of Germany

[21] Appl. No.: 534,447

[22] Filed: Sep. 21, 1983

[30] Foreign Application Priority Data

Sep. 25, 1982 [DE] Fed. Rep. of Germany ....... 3235554

[51] Int. Cl.$^4$ ................................................ F16L 39/00
[52] U.S. Cl. .................................. 285/137 R; 285/387
[58] Field of Search ............... 285/137 R, 137 A, 387, 285/388

[56] References Cited

U.S. PATENT DOCUMENTS

| | | | |
|---|---|---|---|
| 2,813,692 | 11/1957 | Bremer et al. | 285/137 R X |
| 3,125,361 | 3/1964 | Weaver | 285/137 R |
| 3,503,634 | 3/1970 | Cadiou | 285/137 R |
| 3,590,855 | 7/1971 | Woollen | 285/137 R X |
| 3,757,824 | 9/1973 | Parkhurst et al. | 285/137 R X |
| 3,869,153 | 3/1975 | De Vincent et al. | 285/137 R X |
| 4,171,559 | 10/1979 | Vyse et al. | 285/137 R X |
| 4,382,619 | 5/1983 | Grisebach | 285/137 R |

Primary Examiner—Richard J. Scanlan, Jr.
Assistant Examiner—Eric S. Katz
Attorney, Agent, or Firm—Sughrue, Mion, Zinn, Macpeak & Seas

[57] ABSTRACT

A hydraulic coupling device is connected to a multi-line hose comprising a plurality of hydraulic lines housed within a flexible sheath. The coupling device comprises a cylindrical nut, a plurality of plug pins housed within the nut, and means for holding the plug pins within the nut. The plug pins are each connectible to a respective line of the hose. The holding means comprises a holding disc, a retaining disc, and a sleeve. The sleeve is connected to the sheath of the multi-line hose. Each of the plug pins is provided with a pair of longitudinally-spaced collars which define therebetween a peripheral groove. The retaining disc is provided with a respective aperture for each of the plug pins. Each of the apertures has a diameter which is slightly greater than the diameter of one of the collars of the associated plug pin. The holding disc is provided with a plurality of radial slots. The peripheral groove of each plug pin engages within a respective radial slot of the holding disc. The collars of each plug pin are positioned on opposite sides of the holding disc, thereby limiting relative longitudinal movement of that plug pin relative to the holding disc. Said one collar of each plug pin is positioned within the associated aperture of the retaining disc.

14 Claims, 4 Drawing Figures

HYDRAULIC COUPLING DEVICE

BACKGROUND OF THE INVENTION

This invention relates to a hydraulic coupling device for a multi-line hose. The invention is useful in the hydraulic distribution systems used in underground mine workings, particularly for hydraulic advanceable mine roof support assemblies and other hydraulic appliances.

Systems are known in which numerous hydraulic lines are bunched together to form multi-line hoses, which are interconnected by means of generally cylindrical plug couplings. A known plug coupling includes a coupling device having a plurality of plug pins, and a connector having a plurality of sockets which mate with the plug pins, the coupling device and the connector being attached to respective multi-line hoses.

Such a coupling device has a casing which houses the plug pins, the plug pins being supported by a holder within the casing. Each of the plug pins is attached to the holder in such a manner as to permit a slight amount of axial and radial play so that the plug pins can easily be positioned within the sockets of the connector, without forcing or deformation. The holder is a disc provided with apertures for receiving the plug pins, the apertures lying on a common pitch circle.

A known coupling device of this type has a nut which houses the plug pins. The nut is connected to the associated multi-line hose by means of a sleeve. Each of the plug pins has a collar, the collars being braced against an apertured holding disc by abutment faces formed on a retaining disc and on the end of the sleeve. The two discs are connected by means of a central screw to form a composite plate which is held in the nut between an inwardly-extending flange formed within the nut and an annular flange provided at the end of the sleeve. The holding disc is provided with apertures for receiving the plug pins, each aperture having a diameter which is less than that of the collar of the associated plug pin.

The holding and retaining discs of this type of coupling device have different diameters and thicknesses, and both discs are of stepped formation. The retaining disc has a central cylindrical projection which engages within a central circular recess in the holding disc. This disc arrangement, and the provision of the abutment face on the sleeve for bracing the collars of the plug pins, involves a relatively high production cost which greatly increases the price of mass-produced coupling devices of this type. Moreover, the two discs are relatively thick, so that a relatively great weight is involved in the handling of the coupling device. This is particularly the case where the discs (and therefore the entire coupling device) must be of relatively large diameter to accommodate a multi-line hose having a fairly large number of lines, since the plug pins can be positioned only along a common pitch circle. This is because the central zone of the holding disc, which is surrounded by the pitch circle, cannot be used for positioning any of the plug pins, since the connecting screw for the two discs is located here.

The aim of the invention is to provide a coupling device of considerably reduced cost, and which has comparatively small longitudinal and radial dimensions and a comparatively low weight.

SUMMARY OF THE INVENTION

The present invention provides a hydraulic coupling device for a multi-line hose comprising a plurality of hydraulic lines housed within a flexible sheath, the coupling device comprising a casing, a plurality of plug pins housed within the casing, and means for holding the plug pins within the casing, the plug pins each being connectible to a respective line of the hose, the holding means comprising a holder, a retainer, and a sleeve, the sleeve being connectible to the sheath of the multi-line hose, wherein each of the plug pins is provided with a pair of longitudinally-spaced collars which define therebetween a peripheral groove, wherein the retainer is provided with a respective aperture for each of the plug pins, each of said apertures having a diameter which is slightly greater than the diameter of one of the collars of the associated plug pin, and wherein the holder is provided with a plurality of slots, the arrangement being such that the peripheral groove of each plug pin engages within a respective slot of the holder, such that the collars of each plug pin are positioned on opposite sides of the holder thereby limiting relative longitudinal movement of that plug pin relative to the holder, and such that said one collar of each plug pin is positioned within the associated aperture of the retainer.

One advantage of this hydraulic coupling device is that the plug pins can be standard plug pins of the type normally used for single hose couplings.

Advantageously, the retainer is a retaining disc, and the holder is a holding disc, both of said discs having flat parallel opposed faces. Preferably, the retaining disc and the holding disc are detachably held together in face-to-face contact by a plurality of off-centre screw-threaded members. Conveniently, hollow screws constitute the screw-threaded members.

The holding disc is located to the rear of the retaining disc, and its slots are dimensioned to match the dimensions of the peripheral grooves in the plug pins, so that the edge portions of the holding disc that delimit the slots lie in the peripheral grooves of the plug pins, thereby the securing the plug pins to the holding disc with a predetermined amount of play, and in such a manner as to resist axial forces.

Preferably, the retaining disc has the same diameter and the same thickness as the holding disc, and both discs are made of metal. Consequently, both discs can be made from identical metallic blanks. Since the thickness of the retaining disc is matched to the thickness of the collars of the plug pins disposed therein, and the thickness of the holding disc is slightly less than the width of the peripheral grooves in the plug pins, both discs can be of relatively small thickness, so that the total thickness of the composite disc is also relatively small. The retaining disc and the holding disc can, therefore, be simple unstepped flat discs which can be provided cheaply as mass-produced parts. The face-to-face engagement of the two discs results in a stable composite disc which, despite the relatively small thicknesses of the individual discs, is able to resist, in a reliable manner, the loads that occur. The screws which are used to clamp the two discs together may project beyond the retaining disc without causing any trouble. The use of several off-centre screws enables a plug pin to be positioned in the central region of the discs, so that the space within the coupling device is better utilised for accommodating plug pins than is the case with known devices which use a large, central screw for connecting the two discs. Consequently, the entire coupling device can be of relatively small radial dimensions, and so can be of relatively low weight. It is advantageous in this respect if one of the slots in the holding disc extends from the periphery of the holding disc to the central region thereof, said one slot accommodating two plug pins, one of which is positioned at the centre of the holding disc, the other being positioned on a common pitch circle with the rest of the plug pins. In this case, the retaining disc has a separate aperture for each of the two plug pins positioned within said one slot.

Preferably, the slots in the holding disc are radial slots.

In a preferred embodiment, each of the slots in the holding disc has a generally semi-circular base and a portion which diverges towards the periphery of the disc, the bases of the slots being engageable with the peripheral grooves of the plug pins. This facilitates the introduction of the plug pins into the slots in the holding disc.

This coupling device can be used with particular advantage when the conduits of the associated multi-line hose have differing diameters, in which case plug pins of differing diameters have to be used. In a mineral mine working, this is the case where a multi-line hose includes hydraulic conduits used for control purposes and hydraulic conduits used for supplying pressurised hydraulic fluid to hydraulic consumer units such as hydraulic rams and props. In this case, at least one larger diameter plug pin can act as an alignment device for ensuring that the coupling device is coupled to a complementary hydraulic connector with all the conduits in the required positions. Preferably, at least two of the plug pins positioned on the common pitch circle have a greater diameter than the other plug pins, and project further beyond the retaining disc than said other plug pins, these two plug pins constituting an alignment device.

Preferably, the composite disc constituted by the retaining disc and the holding disc is held within the casing between an internal shoulder formed within the casing and an annular flange formed on the adjacent end of the sleeve by means of a screw-threaded ring, said ring surrounding said end of the sleeve and being screwed into an internal thread provided within the casing. The amount of play of the composite disc can be adjusted using the screw-threaded ring.

BRIEF DESCRIPTION OF THE DRAWINGS

A hydraulic coupling device constructed in accordance with the invention will now be described, by way of example, with reference to the accompanying drawings, in which.

DESCRIPTION OF PREFERRED EMBODIMENT

Figure 1:
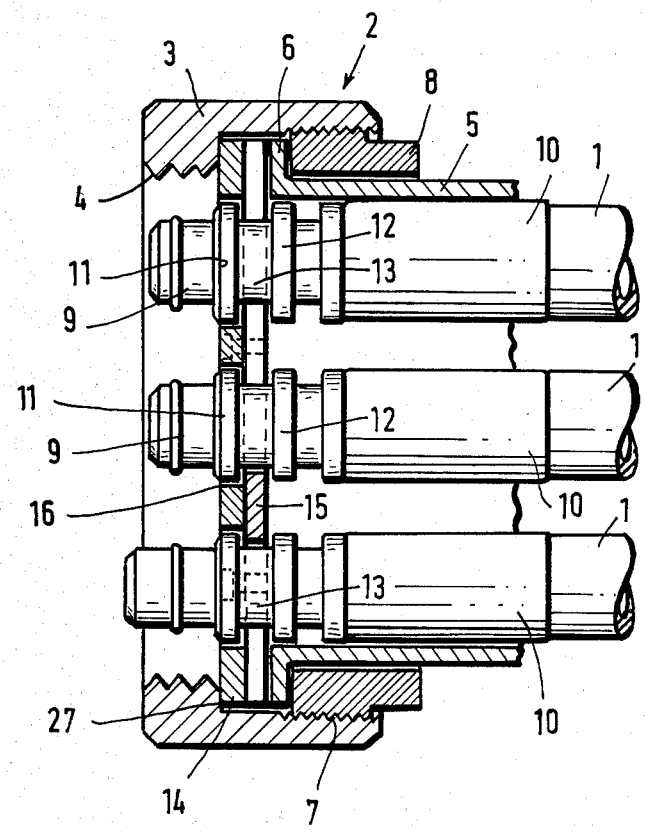
FIG. 1 is a part-sectional side elevation of the coupling device.
Figure 2:
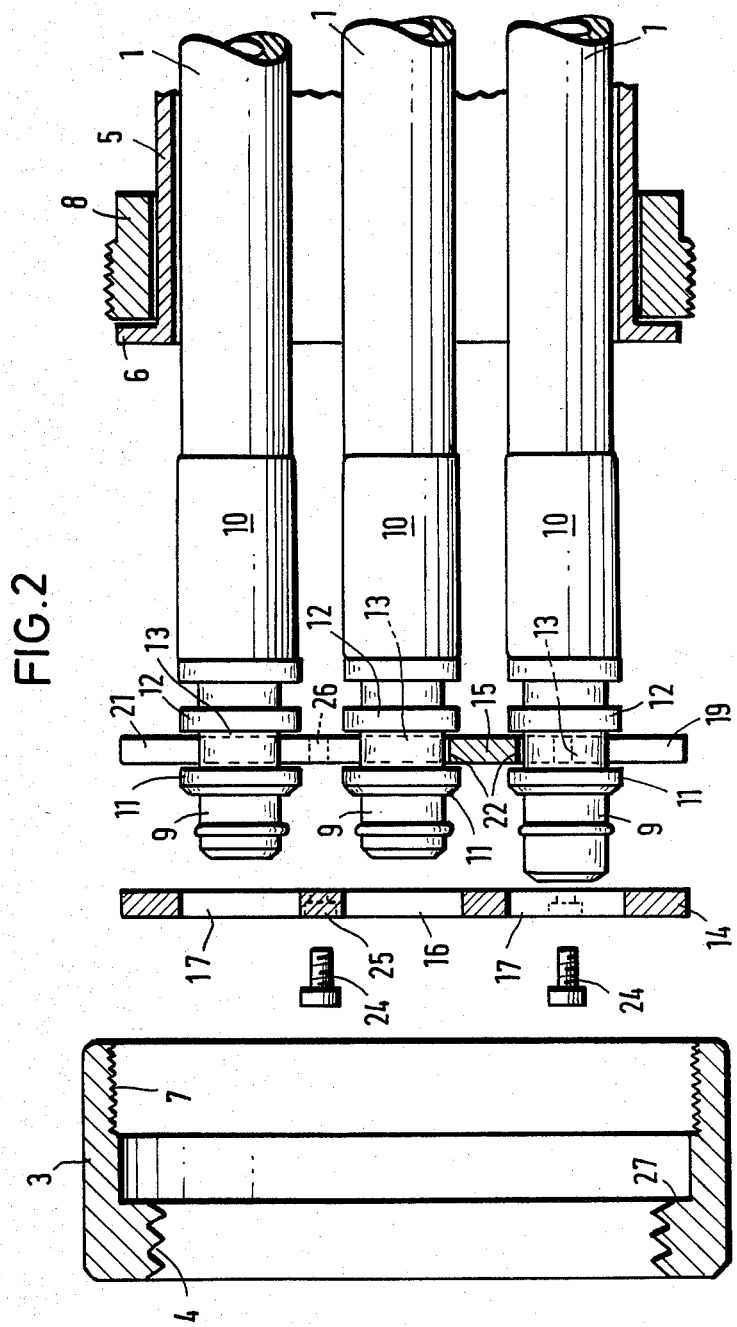
FIG. 2 is an exploded part-sectional view of the coupling device.

Referring to the drawings, FIG. 1 shows a hydraulic coupling device 2 and a hose which is constituted by nine flexible conduits 1, the conduits being bunched together inside a reinforced flexible sheath (not shown). Four of the nine conduits 1 have a diameter which is less than that of the other five conduits, though this is not shown in the drawings. In this case, the smaller diameter conduits 1 may constitute hydraulic control lines, and the larger diameter conduits may serve to supply pressurised hydraulic fluid to hydraulic consumer units such as props and rams. At least one of the larger diameter conduits 1 may form a hydraulic return line.

The coupling device 2, which is arranged at the end of the multi-line hose (as shown in FIG. 1) is connectible to a hydraulic connector (not shown). Usually, a hydraulic coupling device will be arranged at each end of the hose.

The hydraulic coupling device 2 has a casing 3 which takes the form of a cylindrical nut having an internal screw-thread 4. The end of the hose is attached to the nut 3 by means of a rigid sleeve 5, one end of which is attached to the hose by radially-impressed portions (not shown). The other (free) end of the sleeve 5 has an outwardly-extending annular flange 6. The end of the nut 3 that is presented to the hose is provided with an internally threaded recess 7. An externally-threaded ring 8 is screwed into the recess 7, the ring surrounding the sleeve 5, thereby attaching the nut 3 to the sleeve 5. Thus, the nut 3 and the sleeve 5 are rotatable relative to one another, but are interconnected in an axially nondisplaceable manner. They are, however, easily disengageable.

Figure 3:
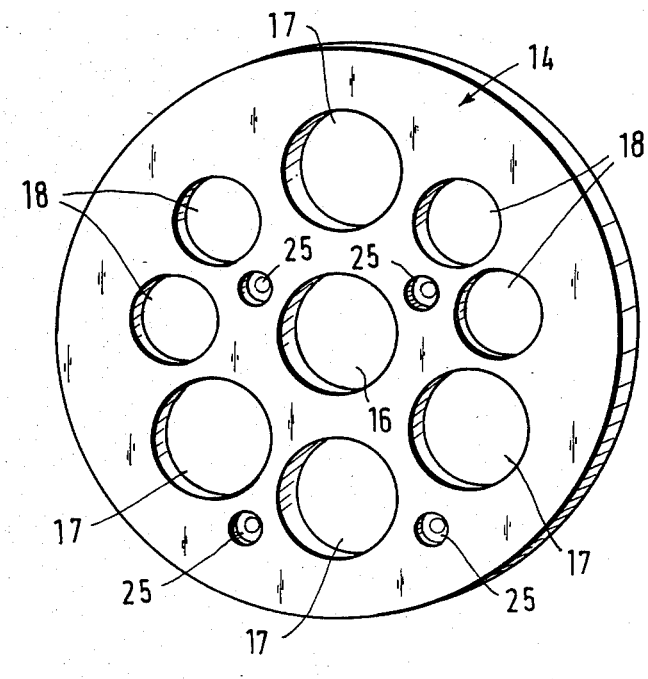
FIG. 3 is a plan view of the retaining disc of the coupling device of FIGS. 1 and 2.

A respective plug pin 9 is connected to the end of each of the conduits 1 by means of a press-fitted sleeve 10. Each plug pin 9 has two longitudinally-spaced collars 11 and 12 with a peripheral groove 13 disposed therebetween. The nut 3 houses a retaining disc 14 and a holding disc 15. The retaining disc 14 is constituted by a circular flat metal disc which is provided with circular apertures 16, 17 and 18 for receiving the collars 11 of the plug pins 9. As shown best in FIG. 3, the retaining disc 14 is provided with a central aperture 16, as well as with eight apertures 17 and 18 arranged along a common pitch circle, there being four smaller apertures 18 and four larger diameter apertures 17. The apertures 16 and 17 have the same diameter. The apertures 18 serve to receive the collars 11 of smaller diameter plug pins 9 which are secured to the smaller diameter conduits 1. The large diameter conduits 1 are associated with correspondingly larger diameter plug pins 9, the collars 11 of which are accommodated in the larger apertures 16 and 17. The diameters of the holes 16, 17 and 18 are slightly larger than those of the collars 11 of the associated plug pins 9, so that the plug pins have a certain degree of play within their apertures. The thickness of the retaining disc 14 is approximately the same as that of the collars 11.

Figure 4:
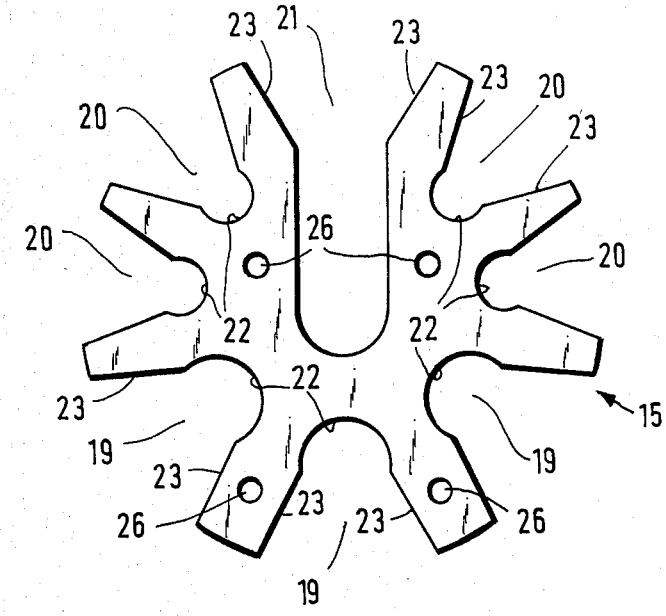
FIG. 4 is a plan view of the holding disc of the coupling device of FIGS. 1 and 2.

The holding disc 15, which is disposed behind the retaining disc 14, is also constituted by a flat metal disc. The diameter of the holding disc 15 corresponds to the diameter of the retaining disc 14, and both discs have the same thickness. The holding disc 15 is provided with eight radial slots 19, 20 and 21 (see FIG. 4), these slots being open towards the periphery of the disc, and being dimensioned to match the associated plug pins 9. Thus, the slots 19 and 21 that accommodate the larger diameter plug pins 9 have a greater width than the slots 20 that accommodate the smaller diameter plug pins 9. The slot 21 is radially deeper than the slots 19 and 20. Thus, the slot 21 extends radially from the outer periphery of the holding disc 15 to a point beyond the middle of the disc, so that the two larger diameter plug pins 9 can be accommodated in this slot.

Each of the slots 19, 20 and 21 has a generally semi-circular base 22; and each slot widens from its base towards the periphery of the disc 15, the two sides 23 of each slot diverging towards the periphery of the disc.

The thickness of the holding disc 15 is slightly less than the width of each of the grooves 13 in the plug pins 9. Thus, the groove 13 of each plug pin engages within the base 22 of the associated slot 19, 20 or 21 in the holding disc 15 (as shown in FIG. 1), so that the plug pins are held by the holding disc in such a manner as to resist axial forces, while ensuring a predetermined amount of play.

As the retaining disc 14 and the holding disc 15 are flat metallic discs, they bear directly against each other over their entire adjacent faces. The two discs 14 and 15 are interconnected by means of four hollow screws 24. The screws 24 extend through holes 25 in the retaining disc 14, and are screwed into threaded holes 26 in the holding disc 15. The two discs 14 and 15 form a robust composite disc.

It will be apparent that the plug pins 9 can be arranged with their peripheries close to each other, and that a plug pin can be provided at the middle of the composite disc 14/15, the collar 11 of this central plug pin lying in the central aperture 16 provided in the retaining disc 14, and being braced against the base of the slot 21 in the holding disc 15.

In order to assemble the coupling device 2, the plug pins 9 are introduced into the slots 19, 20 and 21 in the holding disc 15, so that this disc lies in the peripheral grooves 13 of the plug pins. The retaining disc 14 is then pushed, from the front, over the plug pins 9, and is secured to the holding disc 15 by means of the screws 24. The nut 3 is then pushed over the composite disc constituted by the two discs 14 and 15, and over the plug pins 9 attached to this disc. Finally, the ring 8 is screwed into the internally threaded recess 7 of the nut 3. In the fully assembled position, the two discs 14 and 15 lie between the annular flange 6 of the sleeve 5 and an annular shoulder 27 on the nut 3. By varying the degree to which the threaded ring 8 is screwed into the recess 7, the amount of play of the composite disc 14/15 within the nut 3 can be adjusted. The holding disc 15 secures the plug pins 9 in the longitudinal direction by abutment with their collars 11 and 12, and the retaining disc 14 serves to space and position the plug pins.

In the known manner, the associated hydraulic connector has sockets which mate with the parts of the plug pins 9 which project beyond the retaining disc 14. The hydraulic connector has an external screw-thread on to which the nut 3 can be screwed. When the nut 3 is so screwed on, the plug pins 9 are pulled into the sockets provided in the connector.

The plug pins 9 can be standard plug pins of the type normally employed for coupling individual hoses. The peripheral groove 13 in such a plug pin is designed to permit the engagement of a U-shaped hose clip.

At least one of the larger diameter plug pins 9 which is disposed on the pitch circle (and preferably at least a pair of such plug pins), is longer than the other plug pins (see FIG. 1). This plug pin(s) serve(s) to align and position the individual plug pins 9 with their complementary sockets in the associated connectors when the plug coupling is closed.

We claim:

1. A hydraulic coupling device for a multi-line hose comprising a plurality of hydraulic lines (1) adapted to be housed within a flexible sheath, the coupling device comprising a casing (3), a plurality of plug pins (9) housed within the casing, and means for holding the plug pins within the casing, the plug pins each being connected to a respective line of the hose, the holding means comprising a holder (15), a retainer (14), and a sleeve (5), wherein each of the plug pins includes a pair of longitudinally-spaced collars (11, 12) which define therebetween a peripheral groove (13), wherein the retainer includes a respective aperture (16, 17, 18) for each of the plug pins, each of said apertures having a diameter which is slightly greater than the diameter of one of the collars of the associated plug pin, and wherein the holder includes a plurality of slots (19, 20, 21), the peripheral groove of each plug pin engaging within a respective slot of the holder, the collars of each plug pin being positioned on opposite sides of the holder thereby limiting relative longitudinal movement of that plug pin relative to the holder, and said one collar of each plug pin being positioned within the associated aperture of the retainer.

2. A hydraulic coupling device according to claim 1, wherein the retainer is a retaining disc, and the holder is a holding disc, both of said discs having flat parallel opposed faces.

3. A hydraulic coupling device according to claim 2, wherein the retaining disc and the holding disc are detachably held together in face-to-face contact.

4. A hydraulic coupling device according to claim 3, wherein the retaining disc and the holding disc are detachably connected by a plurality of off-centre screw-threaded members 24.

5. A hydraulic coupling device according to claim 2, wherein the retaining disc has the same diameter as the holding disc.

6. A hydraulic coupling device according to claim 2, wherein the retaining disc has the same thickness as the holding disc.

7. A hydraulic coupling device according to claim 2, wherein the retaining disc and the holding disc are made of metal.

8. A hydraulic coupling device according to claim 2, wherein the slots in the holding disc are radial slots.

9. A hydraulic coupling device according to claim 8, wherein one of the slots 21 in the holding disc extends from the periphery of the holding disc to the central region thereof, said one slot accommodating two plug pins, one of which is positioned at the centre of the holding disc, the other being positioned on a common pitch circle with the rest of the plug pins.

10. A hydraulic coupling device according to claim 9, wherein the retaining disc has a separate aperture 16, 17 for each of the two plug pins positioned within said one slot.

11. A hydraulic coupling device according to claim 10, wherein each of the slots in the holding disc has a generally semi-circular base 22 and a portion 23 which diverges towards the periphery of the disc, the bases of the slots being engageable with the peripheral grooves of the plug pins.

12. A hydraulic coupling device according to claim 9, wherein at least two of the plug pins positioned on the common pitch circle have a greater diameter than the other plug pins, and project further beyond the retaining disc than said other plug pins.

13. A hydraulic coupling device according to claim 2, wherein the composite disc constituted by the retaining disc and the holding disc is held within the casing between an internal shoulder 27 formed within the casing and an annular flange 6 formed on the adjacent end of the sleeve by means of a screw-threaded ring, 8 said ring surrounding said end of the sleeve and being screwed into an internal thread provided within the casing.

14. A hydraulic coupling device according to claim 1, wherein the casing is a cylindrical nut.

* * * * *